(12) United States Patent
Tsoutsaios

(10) Patent No.: US 10,250,414 B2
(45) Date of Patent: *Apr. 2, 2019

(54) METHOD OF CONTROLLING A CODEC NEGOTIATION OF A GATEWAY, A COMPUTER PROGRAM PRODUCT FOR EXECUTING THE METHOD, AND A COMMUNICATION SYSTEM FOR CONTROLLING THE CODEC NEGOTIATION

(71) Applicant: Unify GmbH & Co. KG, Munich (DE)

(72) Inventor: Antonios Tsoutsaios, Agia Paraskevi (GR)

(73) Assignee: Unify GmbH & Co. KG, Munich (DE)

(*) Notice: Subject to any disclaimer, the term of this patent is extended or adjusted under 35 U.S.C. 154(b) by 79 days.

This patent is subject to a terminal disclaimer.

(21) Appl. No.: 15/585,640

(22) Filed: May 3, 2017

(65) Prior Publication Data

US 2017/0237583 A1 Aug. 17, 2017

Related U.S. Application Data

(63) Continuation of application No. 14/399,052, filed on Nov. 5, 2014, now Pat. No. 9,674,000, and a (Continued)

(51) Int. Cl.
*H04J 3/22* (2006.01)
*H04M 7/00* (2006.01)
(Continued)

(52) U.S. Cl.
CPC ............... *H04L 12/66* (2013.01); *H04J 3/22* (2013.01); *H04L 65/104* (2013.01);
(Continued)

(58) Field of Classification Search
CPC .................... H04L 12/66; H04J 3/16
(Continued)

(56) References Cited

U.S. PATENT DOCUMENTS 6,445,697 B1 9/2002 Fenton
7,583,658 B1 9/2009 Wang et al.
(Continued)

FOREIGN PATENT DOCUMENTS

EP 1986408 A2 10/2008

OTHER PUBLICATIONS

Written Opinion of the International Searching Authority for PCT/EP2013/001159 dated Dec. 12, 2013 (Form PCT/ISA/237).
(Continued)

*Primary Examiner* — Iqbal Zaidi
(74) *Attorney, Agent, or Firm* — Buchanan Ingersoll & Rooney PC

(57) ABSTRACT

A method of controlling a codec negotiation of a gateway (1) providing a codec capability offer, e.g. OLC according to the standard H.245, for establishing a data connection (1A, NA, 5T, 12T) to a communication device (10), comprises the gateway (1) providing a DSP resource (5A, 5B) for encoding (C1E) and/or decoding (C1D) of data to be transmitted using a codec which is negotiated between the gateway (1) and the communication device (10), and controlling the gateway (1) to limit (4B1, 4B2, CA2, CA14) a selection of codecs available at the gateway (1) from at least two codecs reserving different amounts of the DSP resource (5A, 5B) respectively, to be included in the codec capability offer to a codec which reserves the least amount of the DSP resource (5A, 5B) such that the communication device (10) is forced (CA4, CA15) to select the codec which reserves the least amount of the DSP resource (5A, 5B).

20 Claims, 12 Drawing Sheets

Related U.S. Application Data continuation of application No. PCT/EP2013/001159, filed on Apr. 18, 2013.

(51) Int. Cl.
  *H04L 12/66* (2006.01)
  *H04L 29/06* (2006.01)
(52) U.S. Cl.
  CPC .......... *H04L 65/1043* (2013.01); *H04L 69/24* (2013.01); *H04M 7/0072* (2013.01)
(58) Field of Classification Search
  USPC ................................................ 370/252–468
  See application file for complete search history.

(56)  References Cited

U.S. PATENT DOCUMENTS

| | | |
|---|---|---|
| 2004/0073433 A1 | 4/2004 | Shlomot et al. |
| 2008/0008312 A1 | 1/2008 | Ganesamoorthi et al. |
| 2012/0033661 A1* | 2/2012 | Knappe ............... H04M 1/2535 370/352 |

OTHER PUBLICATIONS

International Search Report for PCT/EP2013/001159 dated Dec. 12, 2013 (Form PCT/ISA/220).

* cited by examiner

METHOD OF CONTROLLING A CODEC NEGOTIATION OF A GATEWAY, A COMPUTER PROGRAM PRODUCT FOR EXECUTING THE METHOD, AND A COMMUNICATION SYSTEM FOR CONTROLLING THE CODEC NEGOTIATION

CROSS REFERENCE TO RELATED APPLICATIONS

This application is a continuation application of U.S. patent application Ser. No. 14/399,052, which is the United States national phase under 35 U.S.C. § 371 of PCT International Application No. PCT/EP2013/001159, filed on Apr. 18, 2013. The entirety of U.S. patent application Ser. No. 14/399,052 is incorporated by reference herein.

BACKGROUND OF THE INVENTION

Field of the Invention

Embodiments may relate to methods of controlling a codec negotiation of a gateway providing a codec capability offer, e.g. OLC according to the standard H.245, for establishing a data connection to a communication device. Embodiments may further relate to a computer program product for executing such a method and to a communication system for controlling the codec negotiation.

Background of the Related Art

Gateways are commonly used to connect a communication device of a Time-Division Multiplexing (TDM) network with another communication device of a Local Area Network (LAN). The communication device on the TDM-side of the gateway may be a Public Branch Exchange (PBX) system, whereas on the LAN-side of the gateway there may be at least one communication terminal such as an IP-phone. The gateway may comprise a Digital Signal Processor (DSP) resource in terms of processing power which is able to establish a limited number of simultaneous communication connections, often calls or phone calls, depending upon the amount of communication connections requested from the PBX system. The DSP resource may employ a Central Processing Unit (CPU) for processing the Data on the LAN-side of the gateway, in case the PBX system requires more resources for a special period of time, during which high loads appear, additional DSP hardware or additional CPU utilization on the processing source used from an existing DSP (the DSP may use the CPU resources of the Gateway) must be obtained to cover the demands of the PBX systems in terms of simultaneous communication connections, if the processing power of the DSP resource is not sufficient anymore to cover the number of simultaneous communication connections as requested by the PBX system. The communication connections on the LAN-side of the gateway are also called b-channels, abbreviated channels. In cases where the gateway experiences high loads such that the processing power of the DSP resource is not sufficient anymore to handle all requested communication connections, either one or several of the communication connections will be lost or additional hardware equipment has to be available instantly for additional usage of the gateway. It is a disadvantage, that the additional hardware to cover the present need of the gateway for additional processing power is not necessary for the predominant fraction of use of the PBX-system. Therefore, for the vast amount of use of the PBX-system, these additional hardware resources are unused and not required.

In order to enable the gateway to immediately access additional hardware resources in the event of an overload of the DSP resource, the gateway calculates the total number of channels which can be handled simultaneously by the DSP resource of the gateway before additional hardware resources are needed. At present there are two ways to handle the resources of the gateway depending on the way the maximum total number of channels which can be handled simultaneously by a given DSP resource is calculated. The static and dynamic gateway resource handling methods, each of them also called static/dynamic implementation, are explained based on the communication system of FIG. 1. The PBX communication device 9 of a TDM network (Time Division Multiplex) is linked to a gateway 1 comprising a DSP 5 wherein the gateway 1 is linked to an IP phone 10 of a local area network wherein the IP phone may be another gateway, e.g. a gateway connected via an IP network, or an IP endpoint or device. The DSP comprises a DSP resource 5A, 5B wherein the DSP resource 5A is used to establish and/or maintain 8 channels C1-C8. The DSP resource 5B is unused, 8 and able to handle more channels, C9, CN depending on the implementation used wherein N is an integral number/integer equal or larger than 10 indicating the total number of channels of the implementation used From the 8 used channels, the channels C1-C5 are used by the gateway to encode data and transmit the data, 1A, to the IP phone 10. Data from the IP phone 10 is transmitted, NA, to the gateway and decoded by the DSP 5, wherein for encoding and decoding a codec G729, 6, is used. The used channels C6-C8 are encoded and decoded by using the codec G711, 7. The encoded and decoded data is transferred from the gateway 1, 1B, to the PBX and data from the PBX, 9 is transferred, 9A, to the gateway 1 for further transmission via the gateway 1 to the IP phone 10. While the codec G729 compresses data to be encoded, it is called a compressed codec which leads to a data transmission rate of 624 kB/s in a case of a total number of ten bidirectional channels. The codec G711, 7, is not compressing the data to be encoded and therefore called an uncompressed codec leading in the case of a total number of ten bidirectional channels to a data transmission rate of 1744 kB/s. In FIG. 2, a diagram of the available number of channels, NC, depending on the usage of a CPU of the DSP resource, CU, is depicted for the codec G729, 6, and G711, 7. With the static gateway resource handling method, also called static implementation, the number of gateway calls, represented by the number of channels (b-channels) is calculated statically and hardcoded as well as communicated to required components at the start-up of the communication system. The calculation of the number of channels is performed based on a scenario, where the DSP resource not used, 8, will be employed by a codec reserving the largest amount of DSP resource, in the case of FIG. 1 the compressed codec G729, 6. The calculation based on a codec reserving the largest amount of DSP resource is performed since the codec negotiation between the gateway 1 and the IP phone 10 cannot be predicted. Without a channel being processed by the DSP resource 5A, 5B, the DSP resource uses 7% of its CPU in an idle state, I. For each channel using the codec G711, 7, 4% of the CPU usage, CU, and for each channel using the codec G729, 6, 6% of the CPU usage, CU, are reserved. Leaving a reserve necessary for reliability reasons of 20% of the CPU, 80% of the CPU minus 7% for the idle state of the DSP 6, leading to 73% of the available CPU usage, CU for channel reservation. The allowed CPU usage, 5CA, of 80% of the CPU usage, CU is shown in FIG. 2 with dots. In the static implementation, the maximum total number of channels by using the codec G729, 6, is 12, wherein the maximum total number of channels for the codec G711, 7, is 18 (in FIG. 2 a CPU of 300 MHz clock frequency is assumed). Since both codecs 6, 7 are available for the gateway 1, in static implementation, a maximum total number of channels available for the gateway 1 is predicted to 12, N12, since it cannot be predicted whether the unused resources, 8, will only be reserved by the uncompressed codec G711, 7 which would lead to a maximum total number of 18 channels, 118. Regardless of the codec 6, 7 used in active calls reserving channels C1-C8 and with it the used DSP resource, 4A, only 12 gateway calls, N12, can be performed. This implementation is characterized by simplicity, stability and fixed DSP resources, but also by a not optimal CPU usage, CU, since additional hardware resources are required by the gateway 1 when the PBX 9 requires more than 12 channels even though there might be CPU resources left if not all of the used 12 channels are channels encoded and decoded by the compressed codec 6729, 6.

The dynamic gateway resource handling method, also called dynamic implementation, ensures—in contrast to the static implementation—an optimal CPU usage, CU allowing the IP phone 10 and the gateway 1 to dynamically select a codec 6, 7, and constantly recalculating the available resource of the gateway 1. Free codec negotiation is formatting available channel resources of the gateway 1, which in the case of FIG. 1 is the unused DSP resource, 5B, according to codec selection. If only the uncompressed codec G711, 7, would be used in future communication connections, the maximum total number of channels would be 18, N18 which would represent the optimal CPU usage. However, since this maximum number of channels cannot be ensured as it is possible that not only uncompressed codec G711, 7, but also or exclusively the compressed codec G729, 6, will be used, the dynamic implementation only ensures the optimal CPU usage based on the selected codec. The availability of a maximum total number of channels therefore has no fixed value but is in a range between the maximum total number of channels for the static implementation, N12, and the maximum total number of channels for the optimal CPU usage when only uncompressed codec G711, 7 is used, N18. It is a disadvantage of the dynamic implementation that the total number of channels available does not have a fixed value, but may range somewhere between 12 and 18 channels. Especially during a busy hour of the gateway 1 it is thus not possible to precisely predict a necessity of additional hardware resources.

BRIEF SUMMARY OF THE INVENTION

Embodiments of the invention may control a codec negotiation of a gateway leading to a fixed value for the total number of available channels while more effectively using a DSP resource of the gateway.

The method of controlling a codec negotiation of a gateway providing a codec capability offer, e.g. OLC according to the standard H.245, for establishing a data connection to a communication device comprises the gateway providing a DSP resource for encoding and/or decoding of data to be transmitted using a codec which is negotiated between the gateway and the communication device, and controlling the gateway to limit the selection of codecs available at the gateway from at least two codecs reserving different amounts of the DSP resource, respectively, to be included in the codec capability offer to a codec which reserves the least amount of the DSP resource such that the communication device is forced to select the codec which reserves the least amount of the DSP resource. Any data such as a file, e-mail, fax etc, and/or media such as speech, audio data, instant messaging text, SMS, video, MMS, a picture etc may be transmitted over the data connection. Thus, the data connection may be a data/media connection and/or the data may be data/media of any sort. The gateway may provide a codec capability offer in the form of an OLC (Open Logical Channel) offer according to the standard H.245.

BRIEF DESCRIPTION OF THE FIGURES

Further embodiments and advantages of the invention are highlighted in the following with respect to figures. For an improved clearness, the figures are not true to scale or proportionate.

In the figures, as long as not mentioned otherwise, same references indicate same parts with same meaning. It illustrates.

DETAILED DESCRIPTION OF THE INVENTION

Figure 1:
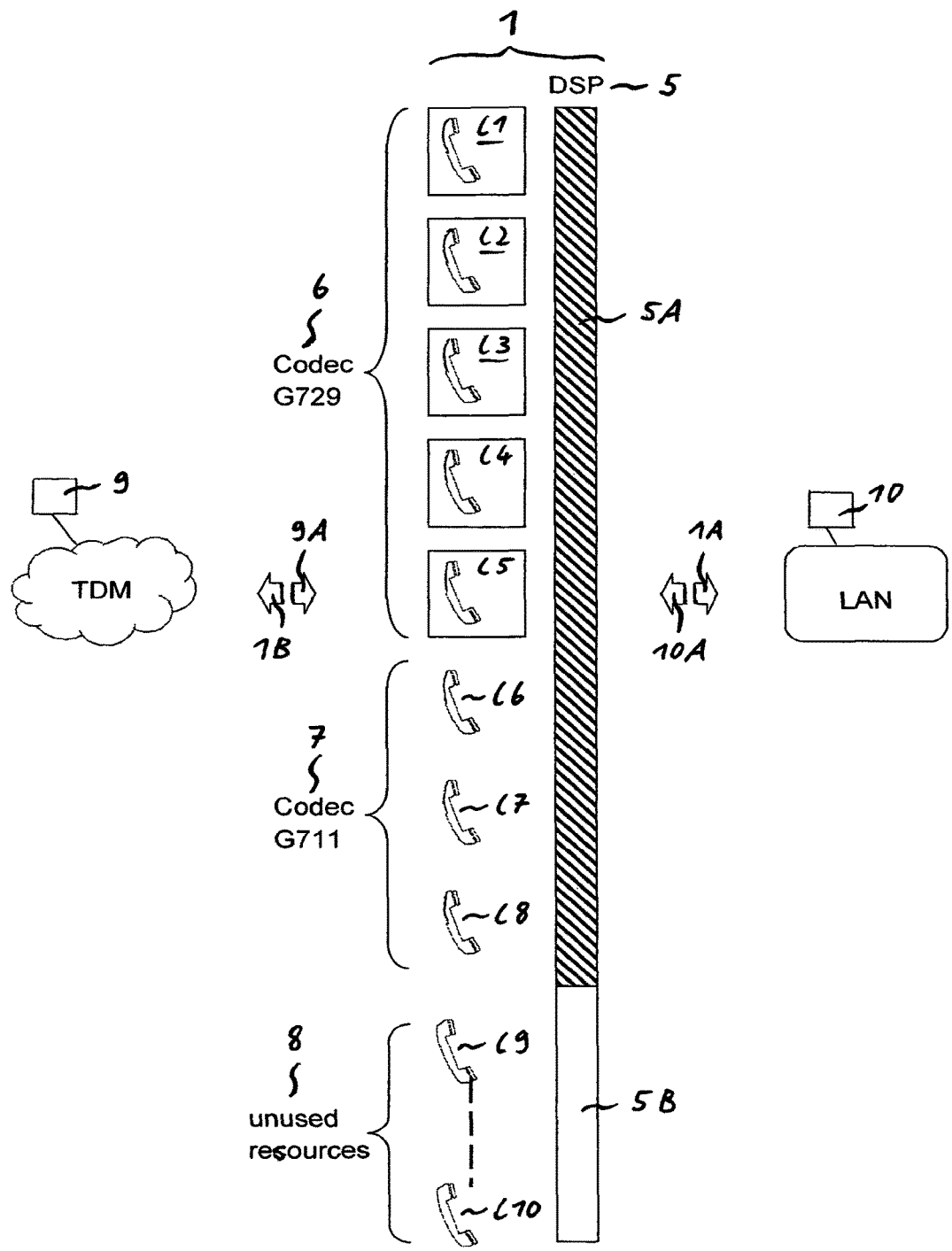
FIG. 1 a schematic communication system comprising a gateway interfacing a time division multiplexing network and a local area network, FIG. 2 a functional diagram indicating a total number of available channels depending on the usage of a CPU comprised by the DSP resource, FIG. 3 a schematic gateway architecture including a flow of messages according to the invention, FIG. 4a a schematic flowchart of messages during codec negotiation according to the invention, wherein the gateway side initiates the call, FIG. 4b a schematic flow of messages according to the invention, wherein the communication device initiates the call, FIG. 5 a schematic message flow according to the invention, wherein used channels are monitored and a total number of available channels using the DSP resource is calculated, FIGS. 6a-6c functional diagrams of a total number of available channels depending on the usage of a CPU of a DSP resource in a dynamic implementation, a static implementation, and by executing the inventive method at subsequent states after activation when at activation channels are used, FIG. 7 a schematic message flow according to the invention, wherein a codec is switched to a codec reserving a least amount of the DSP resource while a channel is in use, FIG. 8 a schematic flow of signaling and payload messages according to the invention when a codec is switched while a channel is in use, and FIG. 9 a schematic message flow according to the invention for deactivating the method.

The method of controlling a codec negotiation of a gateway providing a codec capability offer, e. g. OLC according to the standard H.245, for establishing a data connection to a communication device comprises the gateway providing a DSP resource for encoding and/or decoding of data to be transmitted using a codec which is negotiated between the gateway and the communication device, and controlling the gateway to limit the selection of codecs available at the gateway from at least two codecs reserving different amounts of the DSP resource, respectively, to be included in the codec capability offer to a codec which reserves the least amount of the DSP resource such that the communication device is forced to select the codec which reserves the least amount of the DSP resource. Any data such as a file, e-mail, fax etc. and/or media such as speech, audio data, instant messaging text, SMS, video, MMS, a picture etc may be transmitted over the data connection. Thus, the data connection may be a data/media connection and/or the data may be data/media of any sort. The gateway may provide a codec capability offer in the form of an OLC (Open Logical Channel) offer according to the standard H.245.

The Open Logical Channel offer opens a logical channel for transport of audiovisual and/or data information. Possible replies to the OLC offer are acknowledge, reject, or confirm. As an H.245 message, the OLC offer is encapsulated into H.323 messages and transfers among others the codec capabilities that each party, the gateway or the communication device supports. Other offer messages depend on the signaling protocol used, for example, in the Session initiation Protocol (SIP), this information is included in the Session Description Protocol (SDP) which is part of messages exchanged between negotiating parties such as the gateway or the communication device. The codec capability offer is therefore a message regardless of a Voice over IP (VoIP) protocol or another protocol used. The communication device may be an IP phone 10 of a local area network, a wide area network, such as the internet, or any other area network. The communication device may be any mobile or stationary entity capable of sending and/or receiving data over a communication connection. Alternatively to the IP phone 10, the communication device may be a mobile phone, a Personal Digital Assistant, a tablet PC, a laptop or the like. The communication device may also be a stationary unit such as a desktop PC or a server. Instead of an IP phone 10 representing an IP endpoint or device, the communication device may be another gateway, e.g. a gateway connected via an IP network. By controlling the gateway to limit a selection of codecs available at the gateway from at least two codecs reserving different amounts of the DSP resource, such as the uncompressed codec G711, 7, and the compressed codec G729, 6, which is to be included in the codec capability offer to a codec which reserves the least amount of the DSP resource, the communication device is forced to select the codec which reserves the least amount of the DSP resource. The intentional limitation of a pool of different codecs to that reserving the least amount of the DSP resource, an optimal utilization of the DSP resource is guaranteed to achieve a maximum total number of communication connections by using the DSP resource. Since the number of available codecs in the gateway is limited to that reserving the least amount of the DSP resource, the total number of available channels can be calculated precisely which leads to a precise prediction where the additional hardware resources in case of an overload of the DSP resource are required or not. When limiting a pool of different codecs to that reserving the least amount of the DSP resource, the data encoded and/or decoded is manipulated to a less extent compared to a codec which does not reserve the least amount of the DSP resource. Therefore, the codec reserving the least amount of the DSP resource leads to a larger data transmission rate than a codec reserving more than the least amount of the DSP resource. Although the total number of available channels in the gateway is maximized, a data transmission rate may be larger than in the case of the dynamic implementation. Therefore, compared to the dynamic implementation, the inventive method may lead to a larger amount of required bandwidth for using the codec reserving the least amount of the DSP resource.

The disadvantage of a non-optimal usage of a given bandwidth is tolerated especially in cases, where there is sufficient bandwidth to select the codec reserving the least amount of DSP resources. This scenario is typically the case if there are more communication connections requested by the communication device and/or by the PBX system, 9, when there are available channels as predicted in the static implementation. On the other side, as long as there is enough bandwidth provided for data transmission between the gateway and the communication device, the inventive method may be applied at any time. When activated, the method leads to a control of the codec selection for each gateway call such that the least demanding codec in terms of the DSP resource is selected. In contrast to the dynamic implementation, the method ensures that a maximum total number of communication connections is available at the gateway by using the DSP resource. The method may be implemented on any communication platform and/or implemented as software of a PBX system/Gateway. The software implementation may be embodied as a supplement of an existing software or as a new software. The software may be implemented on a PBX system/gateway in form of an update.

Advantageously, the data connection is executed on a channel and a total number of simultaneous channels is limited by the DSP resource wherein the total number of channels is predicted by dividing the usable DSP resource by an amount of a DSP resource reserved by the codec which reserves the least amount of the DSP resource and, if a channel is used, adding the used channel. If there is no used channel, the total number of available channels can be calculated by dividing the usable DSP resource by the amount of the DSP resource reserved by the codec which reserves the least amount of the DSP resource. The amount of the DSP resource reserved by the codec reserving the least amount of the DSP resource may be stored in a controlling unit for controlling the codec negotiation of the gateway which may be linked to or may be a part of the gateway. When a channel or several channels is/are used, the usable DSP resource is smaller by the amount of DSP resource reserved by the used channel/channels wherein the total number of used channels are added to the total number of available channels. This way, the total number of channels that can be handled by the gateway is calculated which allows a precise prediction when additional hardware resources are required by the gateway.

The method may be executed upon activating of the method for all requests received at the gateway until deactivating of the method. This way, a precise prediction of the total number of available communication connections is possible when the method is activated. If the method is deactivated, the gateway may use the static and/or the dynamic gateway resource handling. The method may be activated in situations of high load of the DSP resource. High load of the DSP resource may occur if the total number of available channels according to the static or dynamic implementation is used or almost used. If for example the total number of available channels according to the static implementation is 12, high load of the DSP resource may be indicated by using 10-12 channels. Since the method does not ensure an optimal usage of bandwidth, as is the case with the dynamic implementation, the method may be combined with the dynamic implementation such that during normal load of the DSP resource the dynamic implementation is used and that during high load of the DSP resource the inventive method is used.

The method may be executed by selecting an uncompressed codec, e. g. G711 according to ITU-T, as the codec which reserves the least amount of the DSP resource. The codec capability offer may thus only comprise the uncompressed codec such that the communication device is forced to select the uncompressed codec for the data connection to be established. To enable the dynamic implementation in a gateway along with the inventive method, it is thus sufficient to store an uncompressed codec and a compressed codec in the controlling unit for controlling the codec negotiation of the gateway which may be linked to or be part of the gateway. The compressed codec may be G729 according to ITU-T.

In another embodiment, the codec capability offer from the communication device is replied at the gateway with the uncompressed codec. This way it is ensured, that not only by codec capability offers provided by the gateway but also with codec capability offers provided by the communication device, a codec reserving the least amount of the DSP resource of the gateway is selected as the codec to be used for encoding and/or decoding of data to be transmitted on the data connection to be established.

The method may be activated according to at least one predetermined time slot, e. g. configured on a configuration unit managing the gateway, wherein the at least one predetermined time slot is stored in a data base connected to the configuration unit. The predetermined time slot may be determined by a user by marking a time interval, such as a defined time interval during a day, a week, a month, and/or a year. For example, a "rush hour" indicating a busy hour for the gateway may be marked as a time interval starting at 11:00 a.m. and ending on 3:00 p.m. from Monday through Saturday. Other periodic or non-periodic time intervals are possible. The configuration unit which manages the gateway may be linked to or be part of the gateway. Conveniently, a user interface is provided, e. g. in form of a calendar application to allow a user to activate and/or deactivate the method of one of the preceding claims and/or to select the at least one predetermined time slot. The calendar application may be an e-mall application such as outlook, a product of the Microsoft Corporation, or another program which is installable and executable on a computer or other processing entity. The user interface may be a touchscreen, a screen and a keyboard, or any other interface allowing a user to select the at least one predetermined time slot. A simple interface may therefore be a loudspeaker and microphone for audio commands (microphone) and audio hints to the user (loudspeaker). The loudspeaker and the microphone may be a single entity. Other user interfaces are possible. A special widget where the user is able to select the at least one predetermined time slot during which a method is activated may be installed on the configuration unit managing the gateway. The at least one predetermined time slot may be stored in a data base and when a clock reaches the predetermined activation time defined by the time slot, the gateway is signaled by the configuration unit to activate the method. A respective procedure may be followed for deactivation of the method. The configuration unit and/or the calendar application may be remotely controllable by the user that may be an administrator.

The method may be activated according to a dynamic time slot upon meeting and/or exceeding an upper limit on a used DSP resource. The term "dynamic time slot" means that the time slot is not defined by a user in a predetermined fashion but determined by the controlling unit controlling the codec negotiation of the gateway or by the gateway itself. The upper limit on the used DSP resource may be set by a user. The upper limit may be defined as a certain percentage of a CPU linked to or comprised by the DSP resource. Once this upper limit is met or exceeded, the method is activated to ensure a maximum total number of available communication connections by using the DSP resource of the gateway.

The method may be deactivated according to a dynamic time slot upon meeting and/or falling below a lower limit on a used DSP resource. The lower limit which may be set by a user, for example an administrator, may be set such that below the lower limit the static implementation and/or the dynamic implementation, respectively ensures a sufficient total number of available channels. When using the dynamic implementation below the limit on the used DSP resource, optimal usage of a given bandwidth of a link between the gateway and the communication device is ensured. The upper and/or lower limit may be preconfigured on the configuration unit managing the gateway. The upper limit and the lower limit may be a single value. The upper limit may indicate that when it is reached the method should be automatically activated to ensure that additional calls will not be lost. The lower limit may indicate that there is no more need for further/additional resources and the method should be deactivated.

In another embodiment, if a channel is used upon activating of the method, and a codec, e. g. G729 according to ITU-T, which is used on the used channel reserves more than the least amount of the DSP resource, the used channel is marked as using a codec reserving more than the least amount of the DSP resource and monitored, and, upon releasing a DSP resource associated with a codec reserving more than the at least amount of the DSP resource, the total number of available channels using the DSP resource is calculated. This way, the inventive method is established gradually in the case of a used DSP resource reserved by a used/active channel which is used with the codec reserving more than the least amount of the DSP resource. Once the channel is no longer active and closed/released, the subsequent channel representing the data connection is opened by the gateway wherein a codec is selected which reserves the least amount of the DSP resource. Therefore gradually, codecs reserving more than the least amount of the DSP resource are replaced by codecs reserving the least amount of the DSP resource.

In a further embodiment, if a channel is used upon activating of the method, and a codec which is used on the used channel reserves more than the least amount of the DSP resource, the codec used on the used channel is switched by the gateway to the codec which reserves the least amount of the DSP resource while the used channel is in use. By the switching of the codec used on the used channel to the codec which reserves the least amount of the DSP resource, the method may instantly replace a codec reserving more than the least amount of DSP resource by a codec which reserves the least amount of the DSP resource. This embodiment may be implemented in a case where the DSP resource is used completely or almost used completely. This may be the case if in the static implementation 10 channels of available 12 channels are used.

A computer program product for executing the inventive method as outlined above may be provided. The computer program product may be a software product comprising instructions. The computer program product may be comprised by a machine readable medium wherein the machine readable medium may be a floppy disk, a CD (Compact Disc), a DVD (Digital Versatile Disc), or any other suitable digital or analogue medium. The invention further comprises a communication system for controlling a codec negotiation of a gateway providing a codec capability offer, e. g. OLC according to the standard H.245 for establishing a data connection to a communication device. The communication system comprises the gateway configured to provide a DSP resource for encoding and/or decoding of data to be transmitted using a codec which is negotiated between the gateway and the communication device, and the controlling unit configured to control the gateway to limit a selection of codecs available at the gateway from at least two codecs reserving different amounts of the DSP resource, respectively, to be included in the codec capability offer to a codec which reserves the at least amount of the DSP resource such that a communication device is forced to select the codec which reserves the least amount of the DSP resource.

Embodiments may also provide communication systems. The communication device may be a mobile phone, a wired phone, such as an office phone, a PDA (Personal Digital Assistant), a PC (Personal Computer), a smartphone, a tablet PC or any other communication device comprising the apparatus features as outlined above. The gateway may be comprised by a server, a communication terminal or may be embodied as a stand-alone entity. The controlling unit may be linked to or be part of the gateway. The controlling unit may be a DSP controller controlling the DSP resource. The DSP resource may be constituted by at least one DSP. Therefore, several DSPs may build the DSP resource. The DSP resource may use at least one CPU wherein the at least one CPU may be able to support at least one data connection.

In the following, the terms "compressed codec" and "uncompressed codec" are used. A compressed codec refers to a codec which requires a larger amount of a DSP resource on a DSP processor in order to encode and/or decode payload data. Uncompressed codec refers to a codec that requires the least amount of the DSP resource which is smaller than the amount required by the compressed codec. Based on the capabilities of a given gateway in terms of supported codecs, the inventive method defines that, when there is demand for further channels using the DSP resource, the method forces the gateway to use the codec with the least required amount on the DSP resource in order to benefit from the maximum total number of channels that can be made available by the DSP resource. Therefore, the codec with the optimal usage of the DSP resource is selected for a data communication to be established when the inventive method is activated and actions performed by the method may aim at forcing to use this codec in all subsequent communication connections to be established. The size of benefit in terms of additional available communication connections compared to the static and/or dynamic implementation depends on the type of codecs supported by the gateway and on the specific codec reserving the least amount of the DSP resource. While in the following only one DSP unit is assumed to be present on the gateway, the inventive method may be executed in a case where more than one DSP unit is available. In this case, for achieving a maximum total number of available channels, the inventive method should be executed for all DSPs. While there are other uncompressed and compressed codecs than G711 and G729 as described in FIG. 1 and FIG. 2, the method is not limited to any particular codec usage, while the codec reserving the least amount of DSP resource is selected for the establishment of communication connections after activation of the inventive method.

Figure 3:
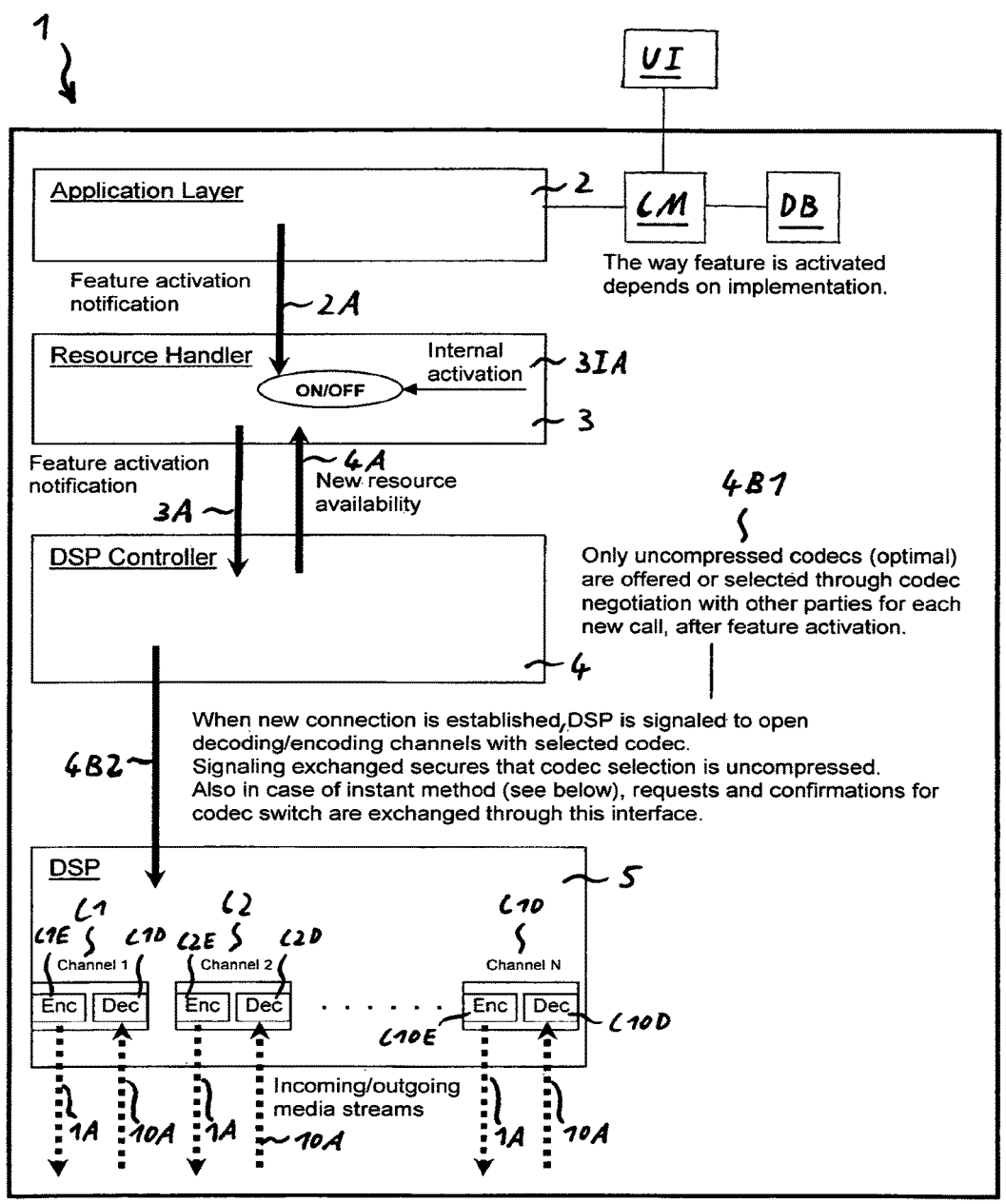

In FIG. 3, a schematic gateway architecture is depicted of a gateway 1, wherein the gateway 1 comprises an application layer 2, which is affected in case that the inventive method is activated/deactivated by a user or by at least one predetermined time slot. A configuration unit managing the gateway CM may be connected to the application layer 2, wherein the configuration unit CM may be connected to a data base DB, which may store predetermined time slots, e. g. in form of a time schedule provided for example via a calendar application forming a user interface UI, which is linked to the configuration unit CM. The configuration unit CM and/or the data base DB may be part of or linked to the gateway 1. The user interface UI may be linked to or be part of the gateway 1. A user may activate or deactivate the inventive method via the application layer 2 by a push on a button. The button may be in form of a mechanical button or an area on a touch screen. Once activated, a message that the inventive method is activated is sent from the application layer 2 via a feature activation notification 2A to a resource handler 3. The inventive method may be activated internally 3IA in the resource handler 3 according to a dynamic time slot upon meeting and/or exceeding an upper limit on the used DSP resource 5A. The resource handler 3 may control the DSP resources 5A, 5B, through data stored describing the DSP's capabilities/resources, and through constantly/periodically monitoring the allocated DSP resources. The resource handler 3 forwards information about activation/deactivation of the inventive method, also called feature 3A, to a DSP controller 4, and receives updates on the availability of DSP resources 4A, up to the point where all used channels use uncompressed codec after activation of the feature. The resource handler 3 receives updates on the availability of DSP resource also if a new upper limit on a used DSP resource 5A or a total amount of channels using the DSP resource is set after the activation of the feature. The DSP controller 4 holds information on which channel using the DSP resource, abbreviated DSP channel, is used for a present communication connection, also called call, on which codec is used an also on the capability supported from a DSP 5, including codec support of the DSP. The DSP controller 4 is responsible for providing these capabilities to signaling components in order for voice/data, capabilities supported by a respective codec to be exchanged between the gateway 1 and the communication device 10. After feature activation, uncompressed codecs are offered or selected through codec negotiation between the gateway 1 and the communication device 10 for each communication connection to be established 4B1. From activation of the feature onwards, all offers on requests received to provide a codec capability offer with codecs supported for new calls, the offers shall contain an uncompressed codec using the least amount of the DSP resource 50. In accordance, answers of the gateway 1 to offers of other parties, such as the communication device 10, are replied by selecting the codec with the lowest impact on the DSP resource which may be a CPU of the DSP 5. The DSP 5 may comprise several channels C1-CN, wherein each channel may comprise a functional unit of an encoder C1E, C2E, CNE, and a functional unit of a decoder C1D, C2D, CND. Each encoder C1E, C2E, CNE of each channel may send data 1A to each other party with which the channel is connected, e. g. encoder C1E to the communication device 10. Each decoder C1D, C2D, CND may receive data NA in form of an incoming media stream from the communication device 10 with which the corresponding channel is connected to, e.g. decoder C1D receives a media stream from communication device 10. The incoming/outgoing data 1A, NA may be in the form of a media stream, e. g. an RTP (Real Time Protocol) media stream. When a new communication connection is established, the DSP 4 is notified on which codec is to be selected for this particular call. The selected codec is forced to be the desired codec through signaling via the encoding unit C1E, C2E, CNE. The exchanged signaling between the gateway 1 and the communication device 10 secures that the codec selection is uncompressed, 402. Also in the case of switching to an uncompressed codec during the used channel, requests and confirmations for the codec switch are exchanged through the interface constituted by the DSP 5. When the new communication connection is established, the DSP 5 starts transmitting and receiving media streams 1A, NA.

Figure 4A:
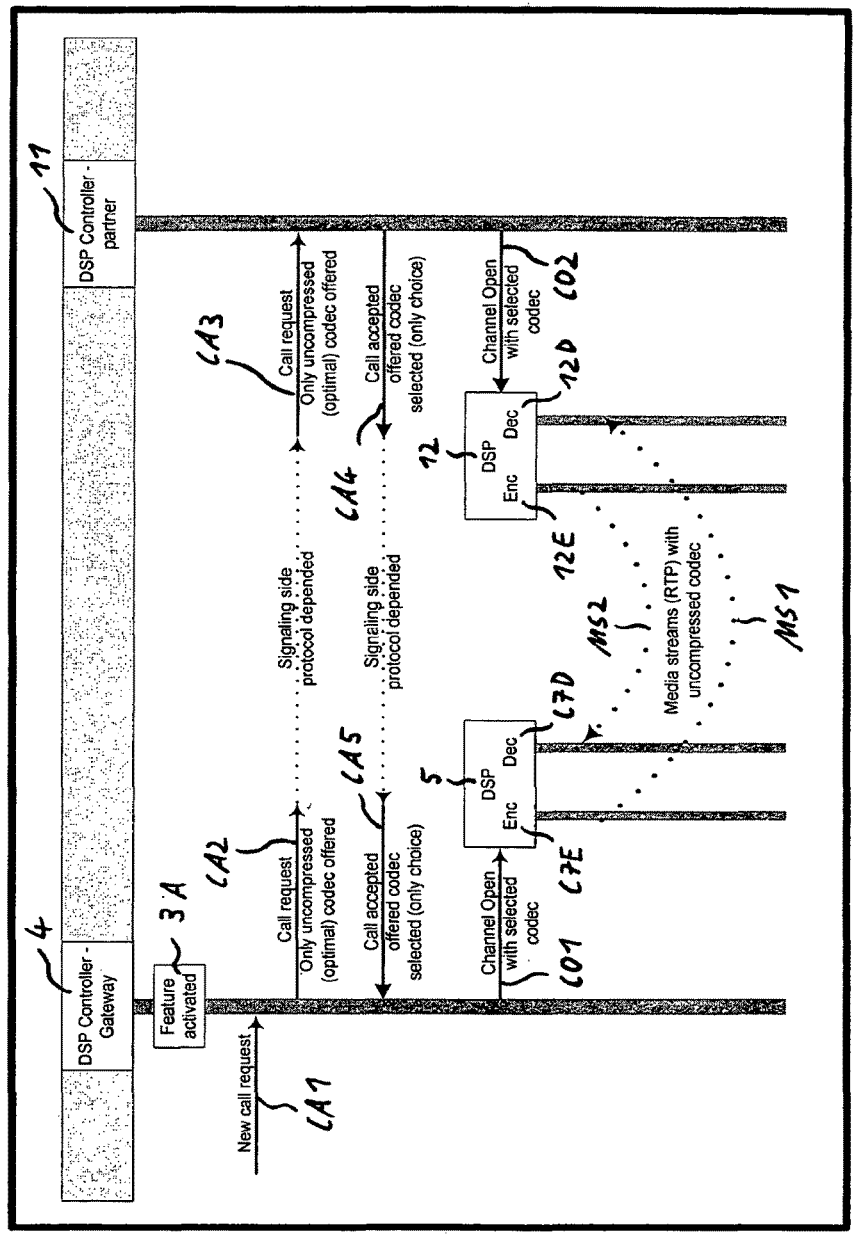

In FIG. 4a, a schematic flow of signaling messages is depicted when a communication connection is established between a DSP controller 4 of the gateway 1 and a DSP controller 11 of the communication device 10. When the inventive method in form of the feature is activated, 3A, and a request for a new call is received, CA1, at the DSP controller 4, for example from the PBX system 9, a call request is sent from the DSP controller 4 to the DSP controller 11, CA2, which comprises only an uncompressed codec in a codec capability offer. The call request comprising only the uncompressed codec which is signaled depending upon the protocol used between the DSP controller 4 and the DSP controller 11 at the DSP controller 11, CA3. The call is accepted with the offered uncompressed codec CA4, which is the only choice of a codec for the DSP controller 11. The accepted call message is signaled from the DSP controller 11 to the DSP controller 4. As a result of the accepted call, a DSP controller 4 opens a channel with the selected uncompressed codec CO1 as the channel is opened with a selected uncompressed codec by the DSP controller 11, CO2. The DSP 5 then sends a media stream with the uncompressed codec MS1, for example an RTP media stream, from its encoder C7A to the decoder 12D of the DSP 12 of the DSP controller 11 of the communication device 10. The DSP 12 sends another media stream MS2 from its encoder 12E to the decoder C7D of the DSP 5 of the gateway 1.

Figure 4B:
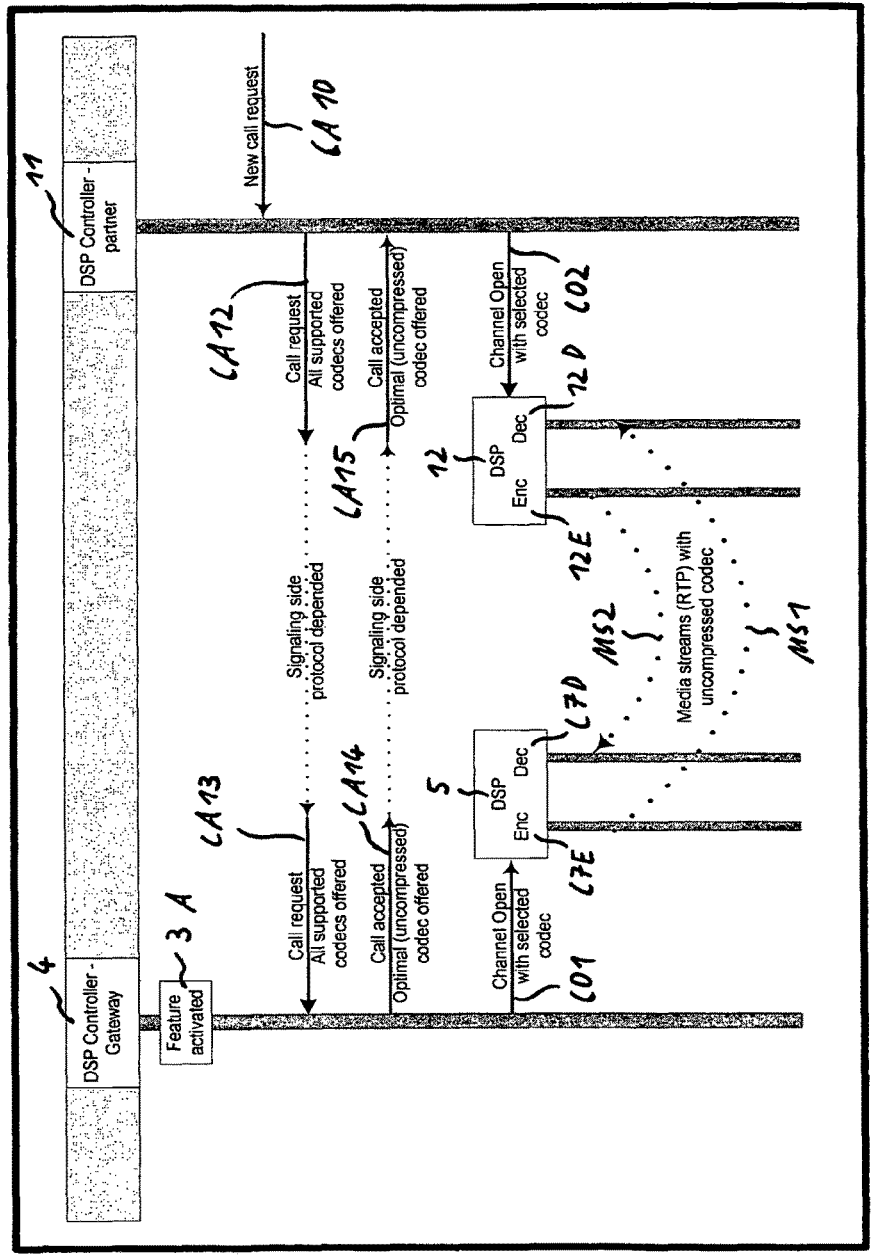

In FIG. 4b, a schematic signaling message flow is shown between the DSP controller 4 and the DSP controller 11 in the case, where the DSP controller 4 received a feature activation notification 3A and there the DSP controller 11 receives a new call request from the communication device 10, CA10. The call request including all supported codecs in a codec capability offer of the DSP controller 11 is sent, CA12 and received, CA13 at the DSP controller 4. The DSP controller 4 selects of the supported codecs by the DSP controller 11 only the uncompressed codec and signals in a codec capability offer the uncompressed codec CA14 to the DSP controller 11, CA15. As a result, the DSP controller 11 signals a channel open message with the uncompressed codec CO2 to the DSP 12, wherein the DSP controller 4 sends a channel open signaling message CO1 to the DSP 5. Subsequently, media streams MS1, MS2 are established between the DSP 5 and the DSP 12 as described before in connection with FIG. 4a. In case of the signaling message flows shown in FIG. 4a and FIG. 4b, the DSP 5 merely receives which codec is selected for each new call via messages from the DSP controller 4 and opens the appropriate encoder C1E, C2E, CNE and/or decoder C1D, C2D, CND, on the channel C1, C2, CN, used for each communication connection. The resource handler 3 and the DSP controller 4 may be embedded in one component. The application layer 2, resource handler 3, DSP controller 4, and the DSP 5 may be embedded in a single or several components.

Figure 5:
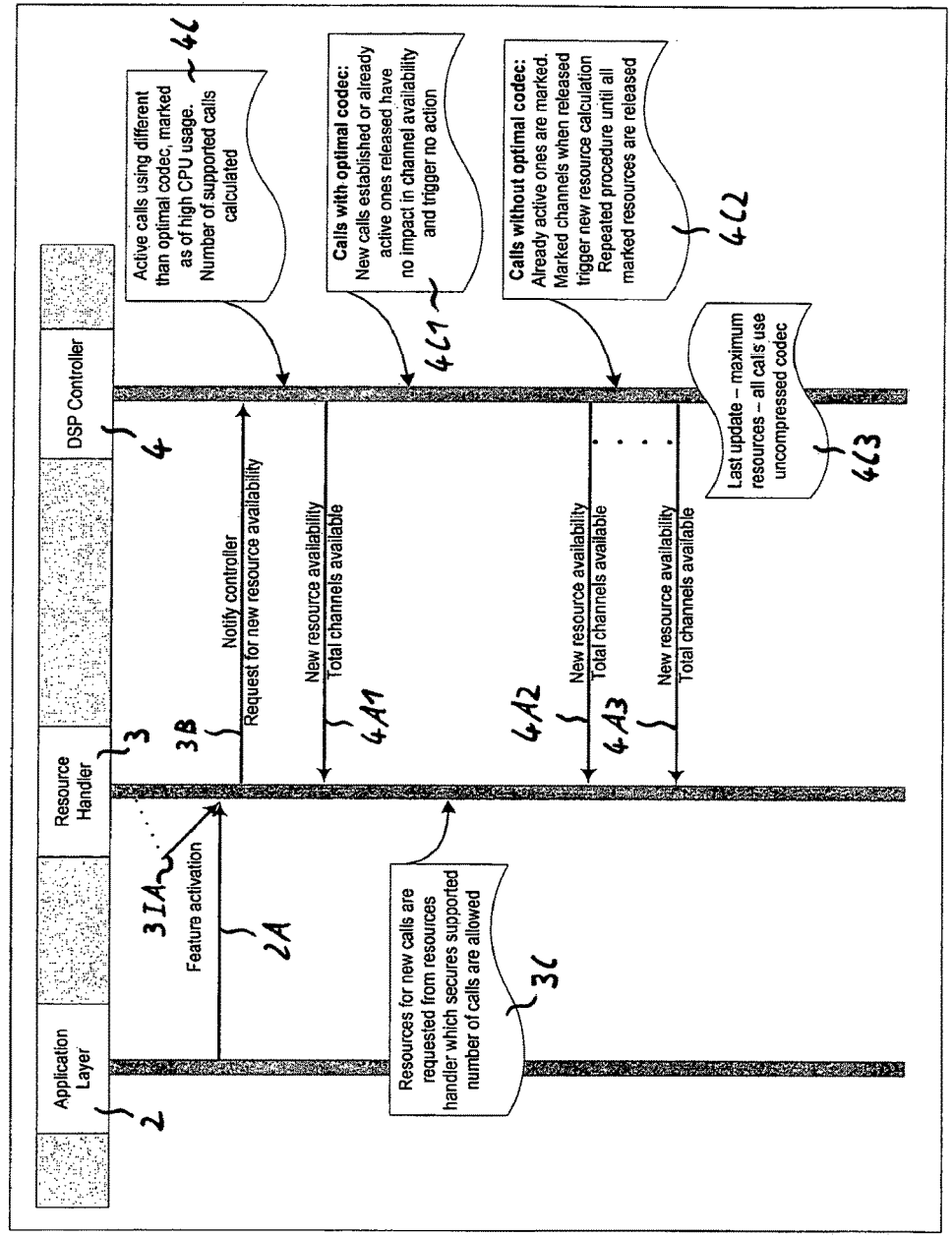

In FIG. 5, a schematic message flow is shown, where used channels are monitored and a total number of available channels using the DSP resource 6B are calculated. The application layer 2 signals feature activation to the resource handler 3, 2A. Alternatively, the feature may be activated internally, 3IA, by the resource handler 3. The DSP controller 4 is notified by the resource handler 3 via a request for an updated available DSP resource 5B, also called new resource availability 3B. The DSP controller 4 determines whether there are used channels in active calls which use a different codec than the codec reserving the least amount of DSP resource. These used channels are marked as using a codec reserving more than the least amount of the DSP resource 5A, 5B. A number of supported channels/calls is calculated by the DSP controller 4, 4C. The DSP controller 4 signals the new resource availability in form of total channels available to the resource handler 3, 4A1. DSP resources for new calls are requested from the resource handler 3 which secures that a supported number of calls is allowed according to the maximum total number of channels supported by the DSP resource 5A, 5B, 3C. New calls established or already active calls released which use the uncompressed codec have no impact on the total number of available channels and trigger no action at the DSP controller 4, 4C1. Already active calls using a codec reserving more than the least amount of the DSP resource are marked and, when these calls are released, trigger a new resource calculation at the DSP controller 4. This calculation of the DSP resource is repeated until all marked channels reserving DSP resources are released, 4C2. The recalculated new resource availability in terms of total channels available is signaled from the DSP controller 4 via signaling messages 4A2, 4A3 to the resource handler 3. A last update on a new resource availability is sent from the DSP controller 4 to the resource handler 3, when all active calls use the uncompressed codec 4C3.

While in the static implementation the total number of available channels is limited by a codec reserving the largest amount of the DSP resource 5A, 5B, in the dynamic implementation the total number of available channels is limited from the free, unlimited codec negotiation and does not have a fixed value. With the inventive method, the total number of available channels is formatted from enforced codec usage by the gateway 1. This way, the maximum total number of available channels is ensured since codec negotiation is not free but controlled by the gateway 1, such that only the codec which reserves the least amount of the DSP resource 5A, 5B can be selected by the communication device 10.

In an embodiment, upon activation of the method, all newly established calls are forced to use the uncompressed codec in order to achieve the maximum total number of available channels from the DSP resource which may be in the form of a CPU cache. With the method activated, OLC offers from the gateway 1 contain only the uncompressed codec and forcing the endpoint in form of the communication device 10 to select the uncompressed codec, while all OLC offers from the communication device 10 are replied with the uncompressed codec as well. This enforced/limited codec negotiation provides the ability to ensure that the DSP resource can be calculated based on the codec reserving the least amount of DSP resource allowing the use of a maximum total number of channels using the DSP resource.

In the case where the gateway 1 is in the idle state 1 upon activation of the method, the maximum total number of channels is available. Further actions are required in the case that there are already used DSP resources 5A by active channels/active calls. For active calls—as shown in FIG. 5—the negotiated codec is freely selected and so it is possible that a compressed codec is already used. Active gateway calls with compressed codec are marked as of using a codec reserving more than the least amount of the DSP resource while the remaining DSP resources 5B are recalculated for exclusively uncompressed codec usage. From the point the feature is activated, channels using compressed codec are monitored and when each of these channels is released, a total number of available channels using the DSP resource 5B is recalculated until normal channels of using the compressed codec remain.

Figure 6A:
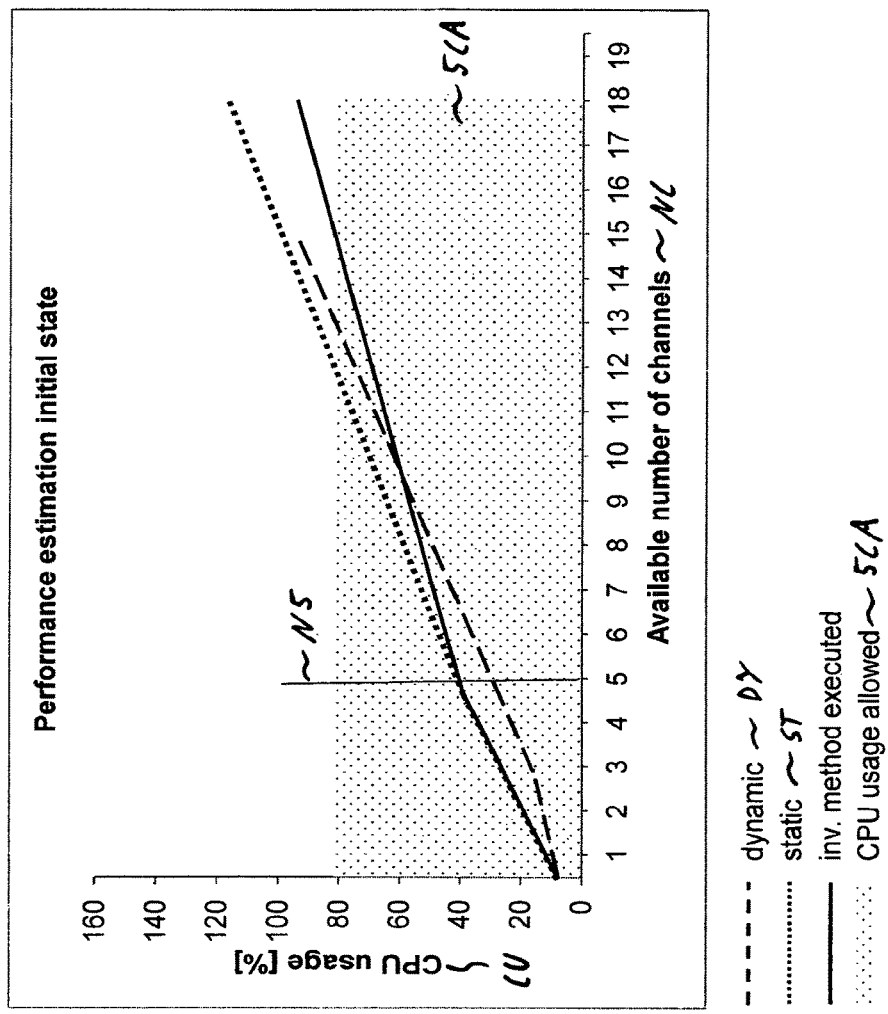
Figure 6B:
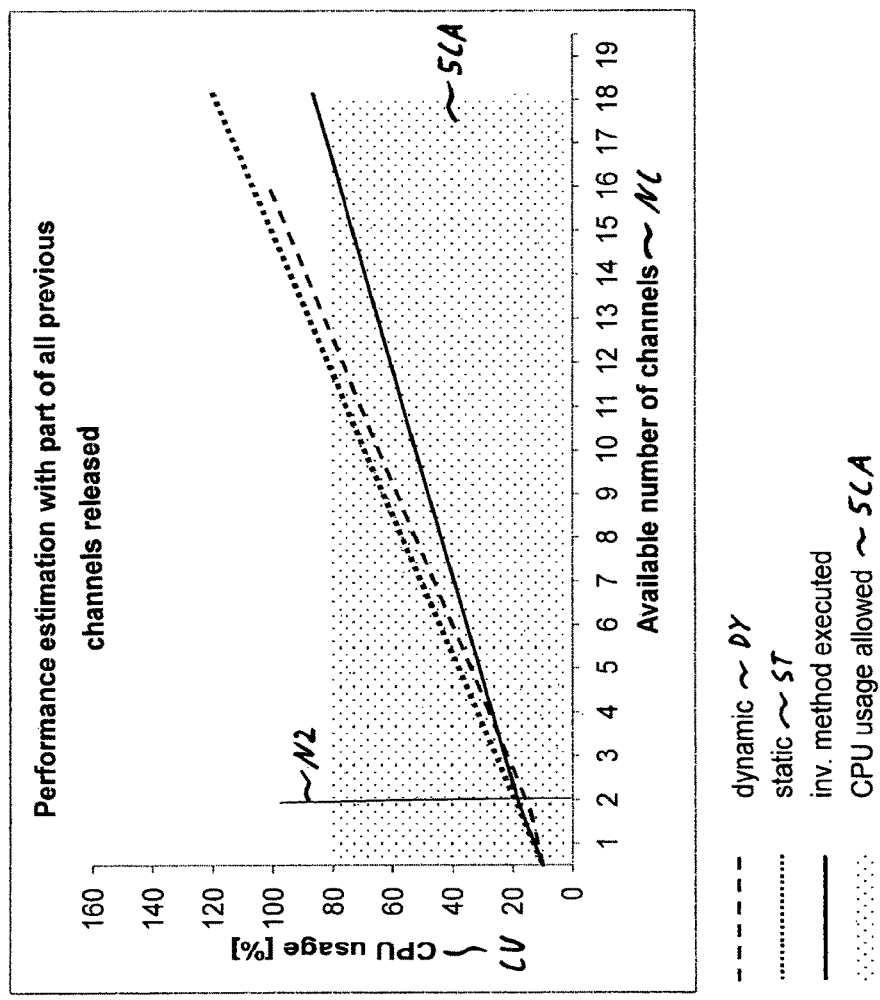
Figure 9G:
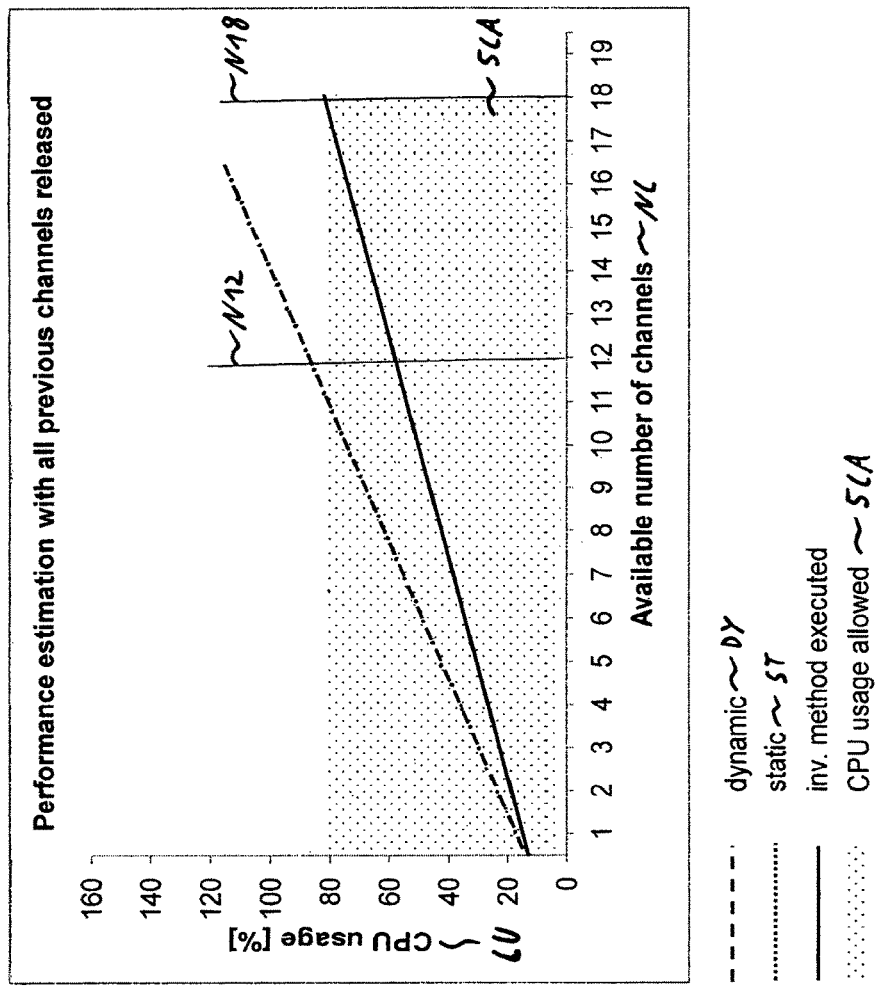

In FIGS. 6a-6c functional diagrams of the total number of available channels, NC, depending on a usage of a CPU, CU, of the DSP resource 5A, 5B are depicted in subsequent states after activating the inventive method. In the functional diagrams the total available number of channels according to the inventive method is compared to that of the dynamic implementation DY and that of the static implementation ST. Referring to the FIG. 1 and FIG. 2, it is assumed that 80% of the CPU usage is allowed, 5CA, and that initially at activation of the inventive method, FIG. 6a, 5 channels, C1-C5, are using the compressed codec G729, 6 and that 3 channels, C6-C8, are using the uncompressed codec G711, 7. For the static and dynamic implementation it is assumed that the total number of available channels of the unused DSP resource 5B is calculated according to the compressed codec 6, since codec negotiation in the static and dynamic implementation cannot be controlled/limited with the codec negotiation being governed for example by a minimized usage of bandwidth of the link between the gateway 1 and the communication device 10. As shown in FIG. 6a with 5 used channels using the compressed codec 6 and 3 used channels using the uncompressed codec 7 in static implementation there are 4 more channels available (80% 5CA−7% I−8×6%=25%; 25%/6%=4.17 channels, i. e. 4 (round down) additional channels). In dynamic implementation, there are 5 more channels available (73%−5×6%+3×4%=31%; 31%/6%=5.17 i. e. 5 (round down) additional channels). Graphically, the one more channel for the dynamic implementation is a result of the shallower gradient for the first 3 channels using uncompressed codec 7 in the case of the dynamic implementation compared to the gradient for the static implementation. The gradient for the fourth channel and further channels of the dynamic implementation is equal to that of the static implementation (the slight difference in gradient is shown in FIG. 6a between the static and dynamic implementation is to be neglected). For better distinguishing the graph of the dynamic implementation from that of the inventive method, the three channels using uncompressed codec 7 are shown in FIG. 6a for the inventive method not as channels 1 to 3 as for the dynamic implementation but as three channels among the channels following the channels 1 to 3 representing channels still using the compressed codec 6.

After feature activation, the 5 channels using compressed codec 6 are marked as of high CPU usage and the available channels are calculated based on the remaining CPU resource available. While each of the high CPU usage channels is released, the remaining DSP resource 5B is recalculated until all used DSP resources 5A prior to feature activation are released. In contrast to the static implementation ST and the dynamic implementation DY, the recalculated total number of available channels is 15 for the inventive method at 77% DSP usage CU, when 5 channels N5 use compressed codec 6 (77%−7% I−5×6%−3×4%=28%; 28%/4%=7 channels, 7 channels+5 channels+3 channels=15 channels).

In FIG. 6b, the subsequent state where 3 channels using compressed codec 6 out of the initial 5 channels and one channel out of the initial three channels using uncompressed codec 7 are already released, is shown. For the inventive method, since 3 of the 5 channels using compressed codec 6 are released, the total number of available channels is 17 at 79% of DSP usage, CU (79%−7% I−2×6%=60%; 60%14%=15 channels, 15 channels+2 channels C1, C2=17 channels. Graphically, there are two channels using uncompressed codec 7 still in use as shown by the shallower gradient for these channels using uncompressed codec 7 in the case of the dynamic implementation compared to the gradient for the static implementation, N2. For better distinguishing the graph of the dynamic implementation from that of the inventive method, these two channels using uncompressed codec 7 are shown in FIG. 6b for the inventive method not as channels 1 and 2 as for the dynamic implementation but as two channels among the channels following the channels 1 and 2 representing channels still using the compressed codec 6 (in correspondence to FIG. 6a).

In FIG. 6c, when all channels C1-C5 using compressed codec 6 are released, the total number of available channels NC is estimated to be 18, N18, for the inventive method, as all channels are using uncompressed codec 7. In contrast, in the static implementation ST and the dynamic implementation DY the total number of available channels is 12, N12. The channel availability for dynamic implementation varies from the worst case for the CPU of 12 channels to the best case for the CPU of 18 channels as depicted in FIG. 6a and FIG. 6c. From the FIGS. 6a-6c it is visible that after activation of the inventive method 50% more channels are available for communication connections to the established.

The opposite procedure as that shown in FIGS. 5, 6a-6c may be followed when the inventive method is deactivated. The amount of DSP resources active/used channels using a codec reserving more than the least amount of the DSP resource 5A, 5B is monitored until the lower limit on a used DSP resource 5A is reached such that a method is deactivated. No additional resources/DSP resources are requested until this limit is reached. When the DSP resources are again equal to the upper limit of normal operation which may correspond to the lower limit on a used DSP resource, the inventive method is fully deactivated and channels are handled according to the static or dynamic implementation or another implementation which is different from the inventive method. In the case of dynamic implementation, after deactivation of the inventive method the system returns instantly to normal operation. DSP's CPU is monitored constantly in this case and the system is aware of resources available for further calls when the inventive method is deactivated. In the case of static implementation, after deactivation of the inventive method there may be active calls that exceed the upper limit of normal operation (the limit set from static implementation restrictions e.g. the upper limit is 12, but since the inventive method was active 14 calls are active at that point). The amount of DSP resources active/used channels is monitored until the lower limit on available DSP resource 5 for normal operation is reached. No additional resources/DSP resources are requested until this limit is reached (e.g. until active calls are less or equal to 12). When the DSP resources are again equal or less than the upper limit of normal operation, the inventive method is fully deactivated and channels are handled according to the static implementation or another implementation which is different from the inventive method.

Figure 7:
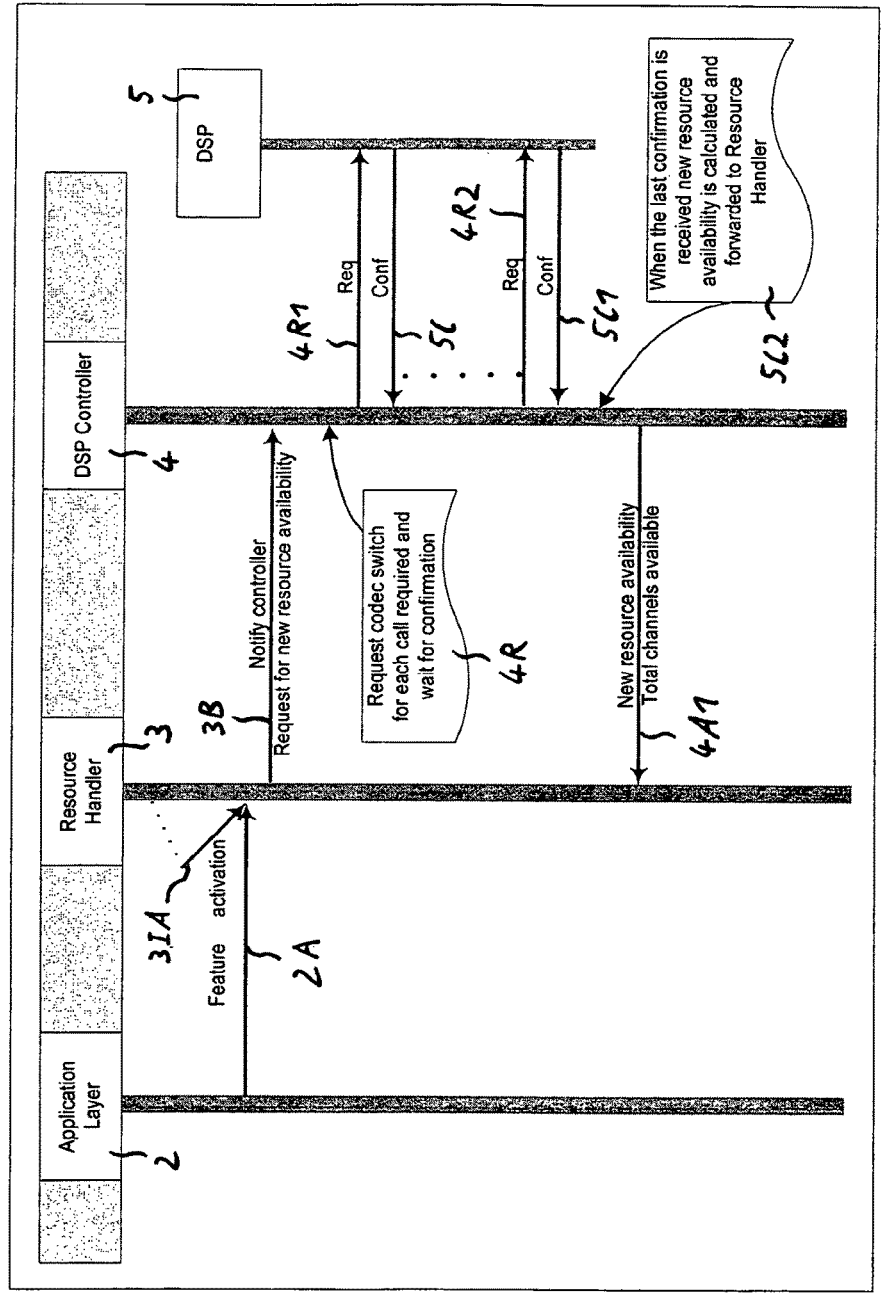

In FIG. 7 a schematic message flow is shown where a codec is switched to the codec which reserves the least amount of the DSP resource. In the embodiment described in FIG. 5, active calls using the compressed codec were marked as using a larger amount of the DSP resource than the least amount of the DSP resource (high CPU usage), 4C, 4C2. Since the active channels using the compressed codec were not switched to the uncompressed codec but continued till these channels were released, the embodiment shown in FIG. 5 is called the inventive method gradually releasing active channels using the compressed codec upon activation of the inventive method, abbreviated gradual method. In contrast to the gradual method, the active calls using the compressed codec upon activation of the inventive method are switched instantly to active calls using the uncompressed codec; therefore this embodiment of the inventive method is called instant method. After activation of the inventive method, all the newly requested calls are handled in the same way as in the gradual method. The instant method describes therefore a different handling for active calls upon activation of the inventive method. In this case, the DSP 5 is notified for activation of the inventive method/feature, and changes the codec used in active calls instantly to the uncompressed codec/the codec reserving the least amount of the DSP resource in case another codec is used. The application layer 2 sends a feature activation message 2A to the resource handler 3. Alternatively the resource handler 3 is internally activated, for example according to a dynamic time slot upon meeting and/or exceeding an upper limit on a used DSP resource 5A. Subsequently, the resource handler 3 notifies the DSP controller 4 by a request for a new resource/DSP resource availability, 38. The DSP controller 4 sends a request message to the DSP 5 requesting a codec switch for each call representing a channel for which a codec switch to the uncompressed codec is required, 4R, and the DSP controller 4 waits for a confirmation from the DSP 5. Therefore, a first request to switch the codec in a first active call is sent from the DSP controller 4 to the DSP 5, 4R1 and the switch is confirmed by the DSP 5 to the DSP controller 4, 50. For another active phone call the DSP controller 4 requests another codec switch to the uncompressed codec 4R2 at the DSP 5 which confirms the codec switch to the DSP controller 4 in a confirmation message 5C1. When the last confirmation is received, a new resource availability is calculated and forwarded to the resource handler 3 via the DSP controller 4, 5C2, in a message of a new resource availability comprising the total number of available channels 4A1.

Figure 8:
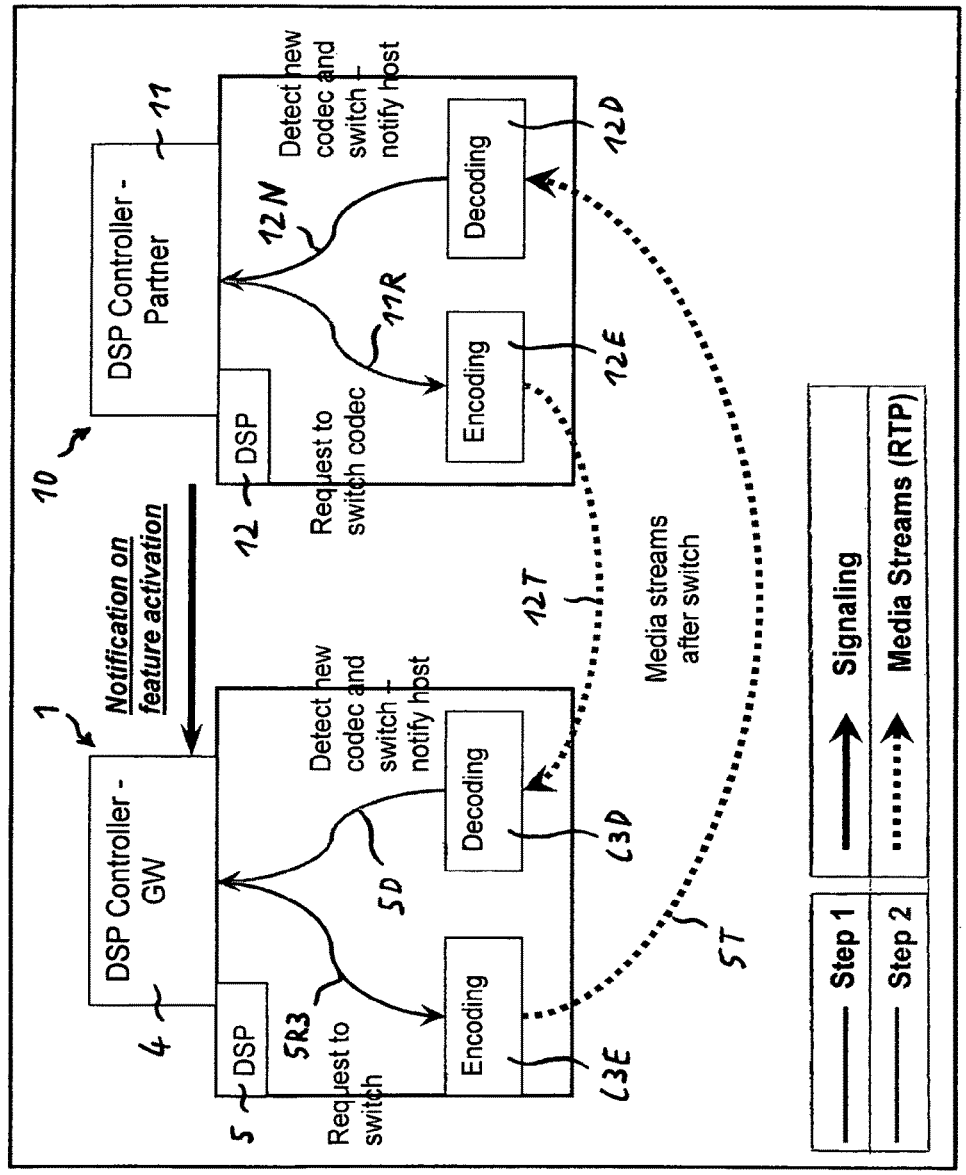

The instant method as an embodiment of the inventive method is further detailed in FIG. 8. In a first step, the encoding side C3E of the DSP 5 is triggered by the DSP controller 4 to switch the codec of an active call, 5R3 and starts transmitting RTP packets with the new uncompressed codec 5T. These packets are received from the decoding side 12D of the DSP 12 of the communication device 10. The decoding side 12D of the DSP 12 detects the codec change and the DSP 12 switches to the new uncompressed codec as well, 12N, which is indicated to the DSP controller 11. At this point, the encoding process on the channel C3 (see FIG. 1) of the DSP 4 of the gateway 1 and the decoding process of the channel at the DSP 12 of the communication device 10 are switched to the desired codec reserving the least amount of DSP resource of the gateway 1.

In a second step, the DSP controller 11 signals a request to switch to the uncompressed codec 11R to the encoding side 12E of the DSP 12. Subsequently, the encoding side 12E transmits an RTP media stream 12T to the decoding side C3D of the DSP 5. Once the RTP media stream 12T is received at the decoding side C3D, the change in the codec from the compressed codec to the uncompressed codec is detected and the decoding side C3D notifies the DSP controller 4, 5D of the forced switch to the new uncompressed codec of the channel C3. In this way, when the inventive method is activated, all active calls are switched to the uncompressed codec and a maximum total number of available channels using the DSP resource/optimum DSP channels availability is established without waiting until marked channels using the compressed codec are released. The switching of the codec from the compressed codec to the uncompressed codec may occur immediately after activation of the inventive method.

Figure 9:
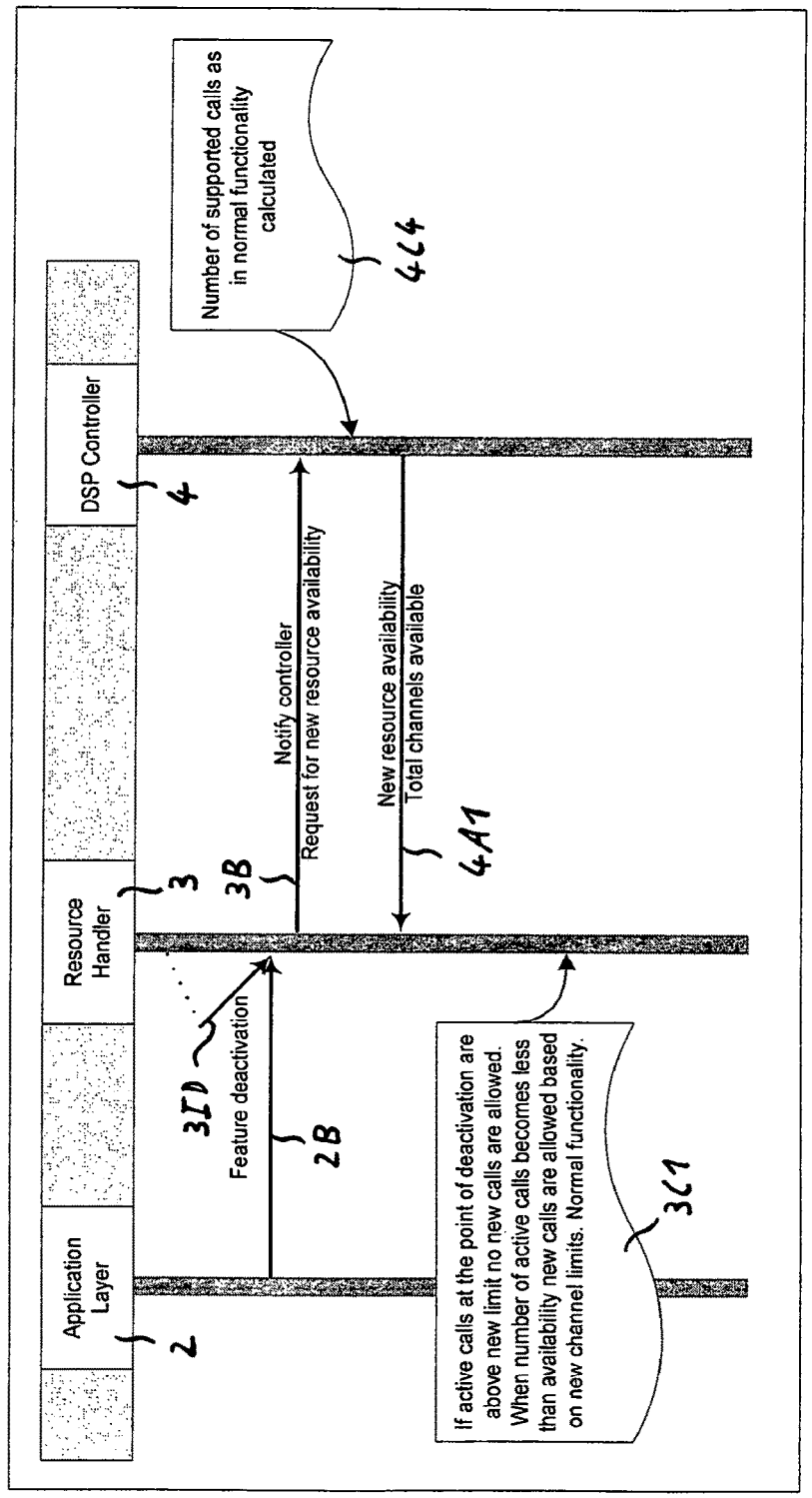

The deactivation of the inventive method as illustrated in the message flow of FIG. 9 may occur in the same or comparable way for the gradual method and the instant method. The application layer 2 sends a feature deactivation message 2B to the resource handler 3. Alternatively, the resource handler 3 may deactivate the inventive method internally, 3ID, for example according to a dynamic time slot upon meeting and/or falling below a lower limit on a used DSP resource, wherein the lower limit is defined as the upper limit for the inventive method. The resource handler 3 notifies the DSP controller 4 with a request for new resource availability 3B in order to, determine the total number of available channels using the DSP resource. The DSP controller 4 calculates the number of supported calls, 404, as is the case if the inventive method is not used (normal functionality of the gateway 1). The total number of available channels is sent from the DSP controller 4 to the resource handler 3 in a message comprising the new resource availability, 4A1. If active calls at the point of deactivation are above the limit in normal functionality of the gateway 1, no new calls are allowed. When the number of active calls becomes less than the number of available channels, new calls/channels are allowed based on the new limit of channels in normal functionality, 3C1. Once the inventive method is deactivated, the gateway 1 operates in normal functionality which may be the static implementation and/or the dynamic implementation. It is referred to the opposite procedure as that shown in FIGS. 5, 6a-5c when the inventive method is deactivated which has been discussed above.

The inventive method may be activated on demand whenever a user such as an administrator demands that the inventive method may be activated. This could occur either by configuring a functional key on an endpoint or client such as the communication device 10 or the PBX system 9. The endpoint/client may activate the inventive method by a push of a button which may be a touchscreen or a mechanical button. Alternatively, a special field or button may be configured in the configuration unit CM managing the gateway 1 (see FIG. 3). This handling presupposes that the available DSP resources/number of available channels using the DSP resource are monitored and displayed at the endpoint/client and/or at the configuration unit CM which may be possible via the user interface UI. The displaying of the available DSP resource/total number of available channels using the DSP resource to a user may occur after a specific request of the user or as an alert message when the communication load/load exceeds a predefined limit to trigger an action of the user. The alert message may occur when the upper limit on a used DSP resource is met and/or exceeded or when the lower limit on a used DSP resource is met and/or fallen below.

Figure 2:
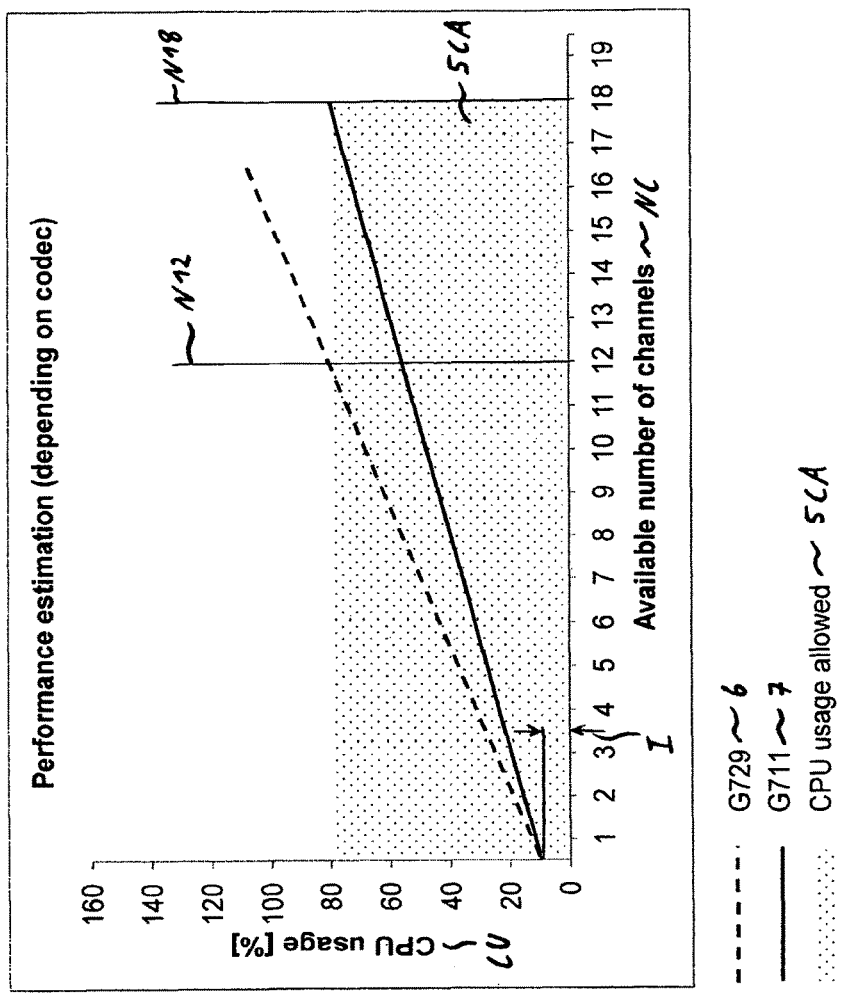

Referring to FIG. 1, the impact on a bandwidth of the link 1A, NA between the gateway 1 and the LAN which represents the bandwidth of the LAN is estimated from the usage of the uncompressed codec. While networks intend to use 100 Mbps speed, for a gateway 1, with 10 DSPs 5 the impact would be for the codec G711, 7: 10×2×87.2 Kbps=1.744 Mbps. For the codec G729, 6: 10×2×31.2 Kbps=0.624 Mbps. It is assumed that the gateway 1 comprises 10 DSPs, wherein each of the 10 DSPs is able to support one channel only. Comparing the data rates of 1.744 Mbps to that of 0.624 Mbps, this results in approximately 1.1% increased network load in case of the use of the uncompressed codec G711, 7 [(1.744 Mbps−0.624 Mbps)/100 Mbps=1.12%]. This increase in the load of the network/LAN is not significant in many cases and tolerable. In addition, the inventive method affects only gateway calls and has no impact on a codec used between endpoints of the LAN such as the communication device 10. A DSP 5 is a processor and based on the capacity of the CPU of the processor. The processor offers a number of channels for a two-way media transmission (see factor 2 in the above equations with respect to G711 and G729). So, each DSP 5 may offer more than one channel and the number of channels is limited by the capacity of the CPU of the DSP. This means that, if one DSP supports up to 10 channels and the gateway 1 comprises and/or is linked to 3 DSPs, the total number of supported channels is 30. In case of multiple DSPs 5 the inventive method is also applicable. Since uncompressed codec requires less DSP resources than a compressed codec, the DSP is allowed to provide a larger number of channels by using the uncompressed codec than by using the compressed codec. The gateway 1 may connect to any IP/TDM network wherein the gateway 1 may connect any IP network with any circuit-switched network such as PSTN (Public Switched Telephone Network) or ISDN (integrated Services Digital Network).

In the following, two PBX installations according to the invention are described, wherein both installations support the instant method and the gradual method of activating the inventive method.

The first example refers to a company that is receiving food delivery orders for employees on several enterprises. This company will normally receive the majority of orders from 11:00 a.m. to 02:00 p.m. (14:00 o'clock) while the rest of the day the amount of orders will be lower. Configuring in the PBX's administration manager a schedule for the activation of the inventive method during this period will provide the required resources to cover the company's needs during the rush hour of 11:00 am. to 02:00 p.m., without a need to acquire further DSP hardware/resources which would be not needed for the rest of the system's operation during the day.

The second example would be a call center of an internet provider company. This company should have an installation with the required DSP resources for normal work days. If a system failure occurs and internet lines are dropped, a lot of dissatisfied customers would call to complain and would be even more disappointed if they would have to wait longer in a queue until there are free "b-channels" to serve them. Alternatively, it might be imagined that there is a new appealing offer for internet services advertised by the internet provider company. Again, many customers might decide to call the company and purchase its services. In these two unpredicted cases in terms of the timeline when a number of customers is calling which is larger than an average number of customers calling, the company's PBX would have to serve an unexpected high load and in both cases it would be important to serve them in time since unhappy customers are a loss for the company and lost future customers are an even greater loss for the company. For these unexpected cases, the dynamic activation of the inventive method according to a dynamic time slot upon meeting and/or exceeding an upper limit on a used DSP resource, which may be combined with a deactivating of the inventive method according to a dynamic time slot upon meeting and/or falling below a lower limit on a used DSP resource would better suit the company's needs than the static or the dynamic implementation since the bandwidth of the LAN is most effectively used in normal business hours and the total number of available channels is maximized in the rush hour by using the inventive method. The gateway 1 would reach the preconfigured upper limit in b-channel resources activating the inventive method and therefore increasing the total number of calls that can be served.

The inventive method of controlling a codec negotiation of the gateway may represent a method to control the codec negotiation during a certain period of time in order to achieve an optimal CPU usage of the DSP and provide a maximum number of (b-)channels resources. Uncompressed codec is enforced from the gateway maximizing the resource availability of the DSP of the gateway. Such an implementation is particularly useful for PBX installations on enterprises that experience high load on specific time slots, while on the majority of time their needs are covered with fewer resources. The method may be activated either based on a static schedule, configured on a configuration manager or dynamically by configuring an upper limit on DSP resource usage for activation of the method and a lower limit on DSP resource usage for deactivation of the method.

A technical feature or several technical features which has/have been disclosed with respect to a single or several embodiments discussed herein before, e. g. the switching of the compressed codec to the uncompressed codec during active calls, 4R, in FIG. 7, may be present also in another embodiment, e. g. the release of marked channels using the compressed codec, 4C2, in FIG. 5, except it is/they are specified not to be present or it is impossible for it/them to be present for technical reasons.

The invention claimed is:

1. A method of controlling a codec negotiation of a gateway providing a codec capability offer for establishing a data connection to a communication device, the method comprising:
   providing, via a gateway, a Digital Signal Processor (DSP) resource for at least one of encoding data and decoding data to be transmitted using a codec negotiated between the gateway and the communication device;
   controlling the gateway to limit a selection of codecs available at the gateway to at least two codecs reserving different amounts of the DSP resource;
   forcing the communication device to select the codec that reserves a least amount of the DSP resource;
   executing the data connection on a channel, wherein a total number of simultaneous channels is limited by the DSP resource;
   predicting the total number of simultaneous channels via a prediction process comprising:
   dividing a usable DSP resource by an amount of a DSP resource reserved by the codec that reserves the least amount of the DSP resource.

2. The method of claim 1, further comprising
   executing the data connection on a channel, wherein a total number of simultaneous channels is limited by the DSP resource;

predicting the total number of simultaneous channels by dividing a usable DSP resource by an amount of a DSP resource reserved by the codec that reserves the least amount of the DSP resource; and, upon a determination that if a channel is a used channel, adding the used channel.

3. The method of claim 2, comprising:

switching the codec used on a channel used upon activating of the method when a codec that is used on the used channel reserves more than the least amount of the DSP resource, the used channel to the codec that reserves the least amount of the DSP resource while the used channel is in use.

4. The method of claim 1, further comprising:

executing the method upon activating of the method for all requests received at the gateway until deactivating the method.

5. The method of claim 1, wherein:

the codec that reserves the least amount of the DSP resource is an uncompressed codec.

6. The method of claim 5, wherein:

a codec capability offer from the communication device is replied to at the gateway with the uncompressed codec.

7. The method of claim 1, further comprising:

activating the method according to at least one predetermined time slot configured on a controller managing the gateway, wherein the at least one predetermined time slot is stored in a database connected to the configuration unit.

8. The method of claim 7, further comprising;

providing a user interface to allow a user to activate or deactivate a method of controlling a codec negotiation and to select the at least one predetermined time slot.

9. The method of claim 7, comprising:

activating the method according to a dynamic time slot upon at least one of meeting and exceeding an upper limit on a used DSP resource.

10. The method of claim 9, comprising:

deactivating the method according to a dynamic time slot upon at least one of meeting and falling below a lower limit on a used DSP resource.

11. The method of claim 1, further comprising:

if a channel is used upon activating of the method, and a codec which is used on the used channel reserves more than the least amount of the DSP resource, marking the used channel as using a codec reserving more than the least amount of the DSP resource;

monitoring the used channel; and, upon releasing a DSP resource associated with the codec reserving more than the least amount of the DSP resource, calculating a total number of available channels using the DSP resource.

12. The method of claim 1, wherein the gateway uses at least one of a static and a dynamic gateway resource handling when the method is deactivated.

13. A non-transitory machine readable storage medium having a program stored thereon, the program defining a method that is performed by a communication apparatus having a processor that runs the program, the method comprising:

providing, a Digital Signal Processor (DSP) resource for at least one of encoding data and decoding data to be transmitted using a codec negotiated between a gateway and a communication device;

controlling the gateway to limit a selection of codecs available at the gateway to at least two codecs reserving different amounts of the DSP resource;

forcing the communication device to select the codec that reserves a least amount of the DSP resource;

executing the data connection on a channel, wherein a total number of simultaneous channels is limited by the DSP resource;

predicting the total number of simultaneous channels via a prediction process comprising:

dividing a usable DSP resource by an amount of a DSP resource reserved by the codec that reserves the least amount of the DSP resource.

14. The non-transitory machine readable storage medium of claim 13, wherein the communication apparatus is the gateway.

15. A communication system for controlling a codec negotiation of a gateway providing a codec capability offer for establishing a data connection to a communication device, the communication system comprising:

a gateway configured to provide a Digital Signal Processor (DSP) resource for at least one of encoding of data and decoding of data to be transmitted using a codec that is negotiated between the gateway and a communication device, and a controller configured to control the gateway to limit a selection of codecs available at the gateway from at least two codecs reserving different amounts of the DSP resource for forcing the communication device to select a codec that reserves the least amount of the DSP resource;

wherein the controller is configured to predict a total number of simultaneous channels by dividing a usable DSP resource by an amount of a DSP resource reserved by the codec that reserves the least amount of the DSP resource.

16. The communication system of claim 15, wherein the controller is a DSP controller.

17. The communication system of claim 15, wherein the controller is configured to control the gateway to limit the selection of codecs available at the gateway from at least two codecs reserving different amounts of the DSP resource to be included in a codec capability offer to the codec that reserves the least amount of the DSP resource such that the communication device is forced to select a codec that reserves the least amount of the DSP resource in response to an upper limit on a used DSP resource being met or exceeded.

18. The communication system of claim 17, wherein the controller is a DSP controller of the gateway.

19. The communication system of claim 15, wherein the controller is configured to control the gateway to limit the selection of codecs available at the gateway from at least two codecs reserving different amounts of the DSP resource to be included in a codec capability offer to the codec that reserves the least amount of the DSP resource such that the communication device is forced to select a codec that reserves the least amount of the DSP resource for all requests to connections received at the gateway until a lower limit for a used DSP resource is met.

20. The communication system of claim 15, wherein the system comprises the communication device and the controller is configured to execute the data connection on a channel so that the total number of simultaneous channels is limited by the DSP resource.

* * * * *